Oct. 22, 1940.      W. U. GARSTKA ET AL      2,218,500

FLOAT SWITCH

Filed Dec. 3, 1937          5 Sheets-Sheet 1

INVENTORS
W. U. GARSTKA
ROBERT C. BURT
BY
ATTORNEYS

Oct. 22, 1940.  W. U. GARSTKA ET AL  2,213,500
FLOAT SWITCH
Filed Dec. 3, 1937  5 Sheets-Sheet 2

INVENTORS
W. U. GARSTKA
ROBERT C. BURT
BY
ATTORNEYS

Oct. 22, 1940.    W. U. GARSTKA ET AL    2,218,500
FLOAT SWITCH
Filed Dec. 3, 1937    5 Sheets-Sheet 4

INVENTORS
W. U. GARSTKA
ROBERT C. BURT
BY
ATTORNEYS

Oct. 22, 1940.  W. U. GARSTKA ET AL  2,218,500
FLOAT SWITCH
Filed Dec. 3, 1937  5 Sheets-Sheet 5

INVENTORS
W. U. GARSTKA
ROBERT C. BURT
BY
ATTORNEYS

Patented Oct. 22, 1940

2,218,500

UNITED STATES PATENT OFFICE 2,218,500

FLOAT SWITCH

Walter U. Garstka, Washington, D. C., and Robert C. Burt, Pasadena, Calif.; dedicated to the free use of the People of the United States of America Application December 3, 1937, Serial No. 177,898

1 Claim. (Cl. 200—84)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the People of the United States of America to take effect on the granting of a patent to us.

This invention relates to an instrument which has for its purpose the conversion of increments of vertical rectilinear motion into electrical impulses and is more particularly adapted to convert increments of the vertical movements of a float into electrical impulses so that positions of said float in a reservoir of liquid can be recorded at a distance upon clock driven charts such as the Bristol or Esterline Angus electro-magnetic strip charts, thus providing a chronological diagram of liquid levels.

The object of this invention is to provide an instrument of the type mentioned that will be economical to operate, dependable, and inexpensive to manufacture.

Another object of this invention is to provide an instrument that will record very accurately definite changes in the liquid level regardless of how slow the rate of change of liquid level may be, and at the same time give a very comprehensive record of the exact time the liquid attained any particular level. Simple mechanisms such as the commutator ring type do not make definite contacts at any given time and cause conditions where the liquid comes to a level at which the circuit closes and remains closed for long periods of time, thereby consuming large quantities of electricity. In the present invention the contact is of a very sharp and distinct nature and of comparatively short duration since the circuit is closed for only a very short period of time, irrespective of the position of the float at any time and irrespective of how slow the level of the liquid changes. This feature has a further advantage over other devices designed for the same use in that it does not give the effect of several changes in level when the liquid maintains a constant level.

Still another object of this invention is to provide a device of the type mentioned that will enable the recordation of both upward and downward movements of the float by the synchronized use of oppositely acting systems symmetrically mounted as a unit and the use of two electrical circuits. Each instant of contact represents a definite displacement in one direction. These two systems are so synchronized that it is not possible for both to act at the same time. This is of great importance since slight wave motions and surgings of the liquid would otherwise cause recordation of a large number of impulses, thus creating the false impression of a great stage height without any actual change of liquid level.

A further object is to provide a device of the type mentioned that will not depend for its action upon commutators or sear trips.

A still further object is to provide a device of the type mentioned that can be used under damp conditions and which will operate on a low voltage direct current such as that supplied by ordinary dry cells.

Another and still further object is to provide a device of this type that will not become damaged should the electric circuit supply fail.

While this instrument is a precision instrument, no precision is required in manufacturing or assembling its parts.

The following description, together with the accompanying drawings, will fully disclose this invention and further objects and advantages thereof will be apparent.

Figure 1:
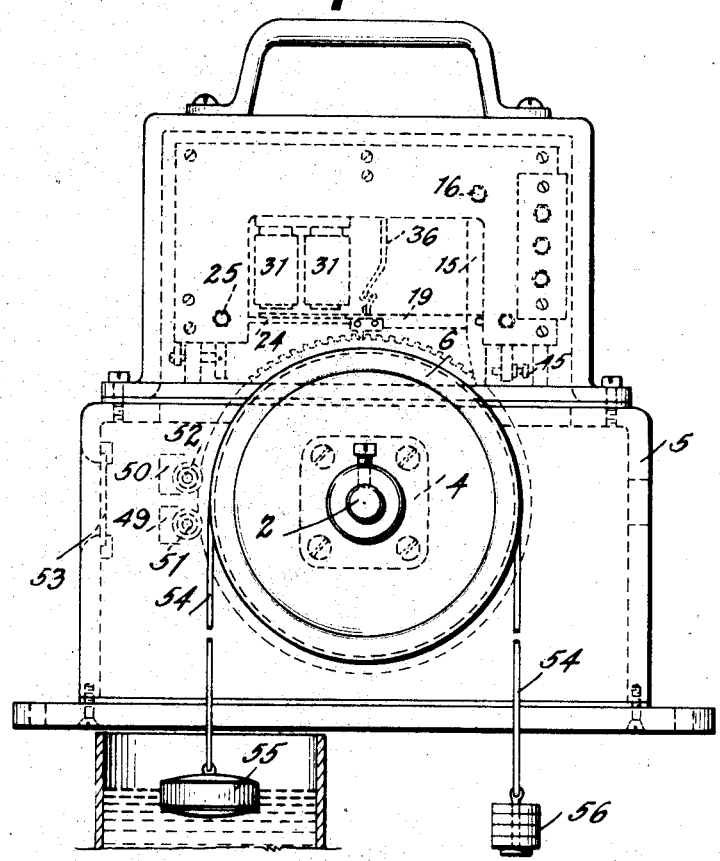
Figure 1 is a side elevational view of the machine.
Figure 2:
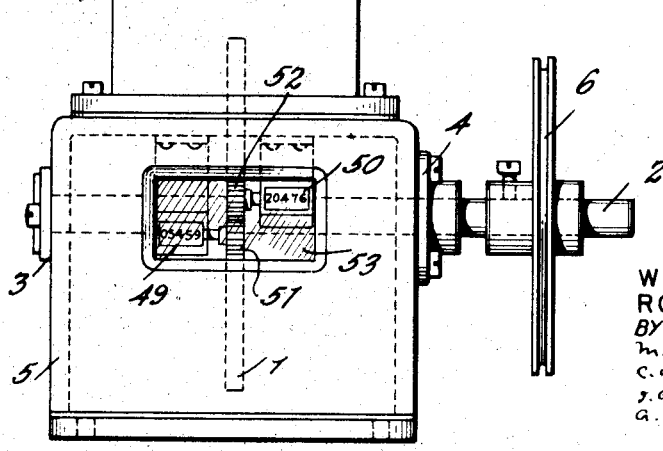
Figure 2 is an end elevational view of the machine.

Referring with more particularity to the drawings in which like parts are designated by like numerals, the numeral 1 designates a gear wheel fixed to a shaft 2 rotatably mounted in antifriction bearings 3 and 4 on the substructure housing 5. Shaft 2 is extended on one side to receive a V-grooved pulley 6 fixed thereon. The bearing 3 is sealed by means of a shellacked bearing plate 7, while the bearing 4 is made substantially water tight by means of oil felt washers 8. The shaft 2 is disposed so that the wheel 1 projects into the superstructure substantially as shown.

The superstructure is adjustably mounted over the substructure by means of the threaded supports 9, 10, 11, and 12 and nuts 13, 13, 13, 13. Said nuts are disposed on the top of the substructure. By adjusting these nuts the vertical height of the superstructure can be controlled. The nuts 14, 14, 14, 14 serve to hold the superstructure in position after adjustment is made.

A vertical arm 15 is keyed to the shaft 16, which shaft is rotatably mounted between the adjustable pivot bearings 17 and 18. The horizontal arm 19 is pivoted at one end to the arm 15 at 20. The other end of the arm 19 has rigidly secured to it a pawl member 21 with counter sunk head screws and is adapted to engage the wheel 1 substantially as shown.

Figure 10:
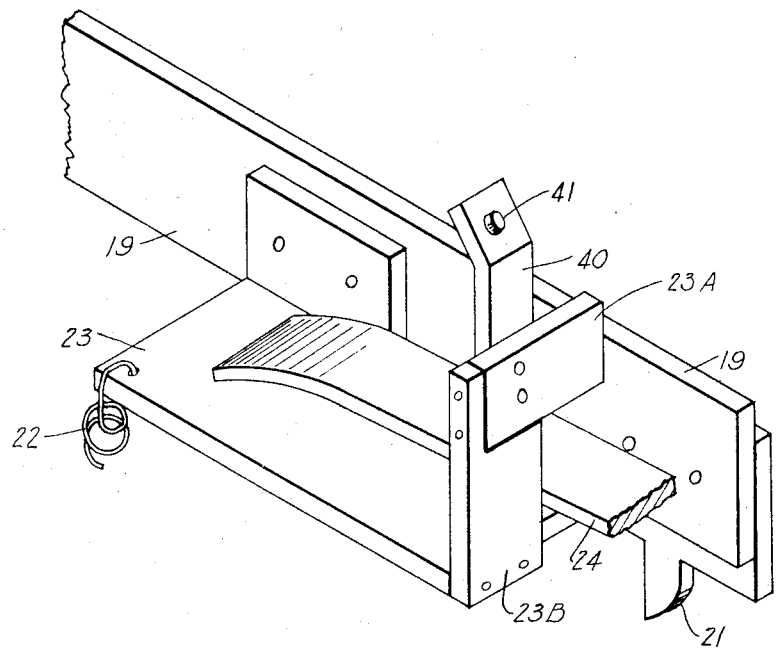
Figure 10 is a fragmentary view in perspective showing the relation between the arm 19 and the armature plate 24.

To the arm 19 there is secured a shelf member 23. A horizontal bar 23a is secured to said shelf member 23, or, if desired, to the arm 19. In Figure 10, the bar 23a is shown attached to the shelf member 23 by means of an upright 23b. To insure a more positive engagement, a spring 22 is tensionally mounted between the shelf member 23 and the arm 15 below the pivot point 20. A hinged armature plate 24 has its free end normally resting on the shelf member 23 and it is disposed beneath the bar 23a. The other end of the armature plate 24 is adjustably fixed to the shaft 25, which shaft is rotatably mounted between pivot bearings 26 and 27. Another arm 28 is also adjustably fixed to the shaft 25 and extends vertically downward therefrom. A spring 29 is tensionally mounted between said arm 28 and the frame of the superstructure, substantially as shown.

An armature 30 of soft iron, or other suitable material, is rigidly secured on the top of the armature plate 24. Directly over said armature a plurality of electro-magnet units 31 are disposed by attachment to the bracket 32. This bracket is secured to the frame of the superstructure through a vertical slot 33 by means of the bolt 34. This allows a vertical adjustment for said electro-magnet units.

On the ceiling of the superstructure directly over the pawl 21, an insulating block 35 is secured. A strip of spring brass 36, or other suitable material, is secured at the top of one side of said block by means of the binding post 37 and is made horizontally adjustable by means of the set screw 38. The lower portion of the member 36 is bent at an angle in the direction of the electro-magnet unit at the end of which a tungsten point 39 is secured. Attached to the bar 23a is a member 40 bent at an angle and also carrying a tungsten point 41 adapted to contact the point 39, substantially as shown.

A stop arm 42 is fixedly mounted at one end to the arm 19 in a vertical position and is designed to abut the stud 43 when the pawl 21 is carried too far by the wheel 1, which occurs when the supply of electricity fails. A spring 44 is tensionally mounted between the frame of the superstructure and the vertical arm 15.

To limit the return movement of the pawl a set screw 45 is provided at the end of the arm 46 and designed to abut the lower part of the vertical arm 15. The arm member 46 is adjustably fixed to a shaft 47, which shaft is adjustably secured to a bracket 48 fixed to the frame of the superstructure.

Veeder counters 49 and 50 are mounted on suitable brackets within the substructure and their pinion gears 51 and 52, respectively, engage the wheel 1. A window of glass 53, or other transparent means is provided to make observations of these veeder counters.

The above described device is adapted for use for a one-directional movement of the float and its operation is as follows: A flexible cable 54 is placed in the groove of the pulley 6. On one end of the cable a float 55 resting on the liquid to be gauged is attached, and on the other end of the cable a counter weight 56 is attached. When the level of the liquid falls, the float 55 is lowered, thereby rotating the pulley wheel 6 in a counter-clockwise direction (as would appear in Figure 4), which in turn rotates the gear wheel 1 in the same direction, dragging the pawl 21 with it to the left. This moves the tungsten point 41 toward the tungsten point 39 and when it has moved far enough a contact is made thereby closing an electrical circuit which sends an impulse to a recording device of the type above-mentioned. The closing of this circuit also energizes the electro-magnet unit 31, which is in circuit with the recording device or register and which then attracts the armature 30, pulling it upward together with the member 24, which in turn abuts bar 23a elevating arm 19 and the appended members comprising the pawl 21, the member 40 and the tungsten point 41. The elevation of the pawl is sufficient to clear it of the teeth of the gear wheel 1 at which instant the spring 44 causes a separation of the tungsten points. This, in turn causes the circuit to break, thus demagnetizing the coils 31, thereby releasing the armature 30 and allowing the pawl to drop. With the aid of the springs 22 and 44, the pawl is brought back to its initial position to engage the next successive tooth of the gear wheel. This initial position is made adjustable by means of the set screw 45. This constitutes a complete cycle of operation.

Should the electric current fail, the pawl would not be lifted by the electro-magnets 31 and, unless some provision was made, the wheel 1 would continue to drag the pawl with the inevitable result that the instrument would be damaged. To avoid such destruction, the member 42 is provided which engages the stud 43 when the pawl moves too far. This has the effect of stopping any relative movement between the vertical arm 15 and the horizontal arm 19, causing them both to revolve about shaft 16, the consequence of which is that the pawl is elevated by further movement of the gear wheel 1 and is eventually in a position free from the gear teeth.

Figure 4:
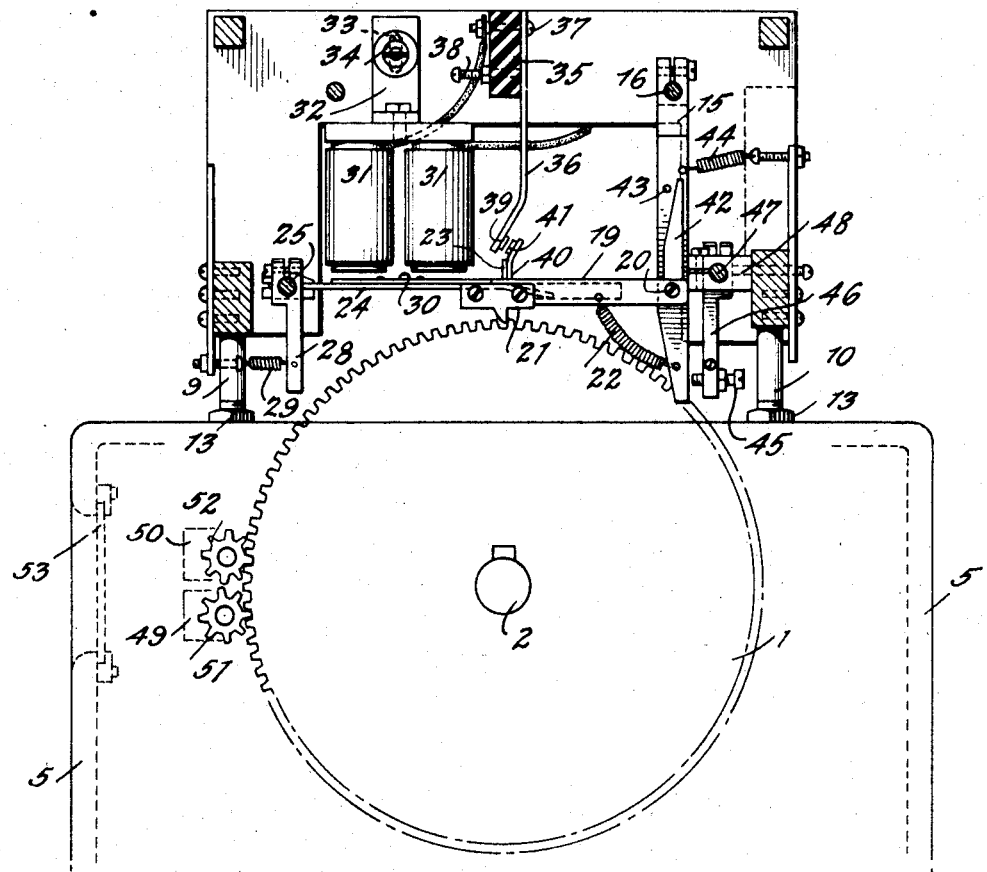
Figure 4 is a side elevational view of a cross-section of the superstructure along the line 4—4 of Figure 3, showing its mechanical relationship with the substructure.
Figure 3:
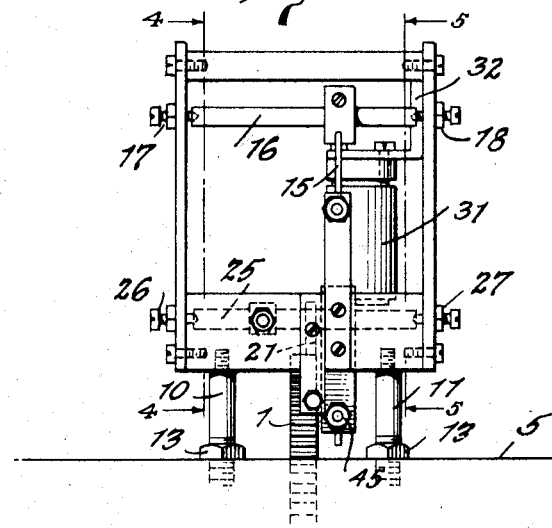
Figure 3 is an end view of the superstructure as it appears with the housing removed.
Figure 5:
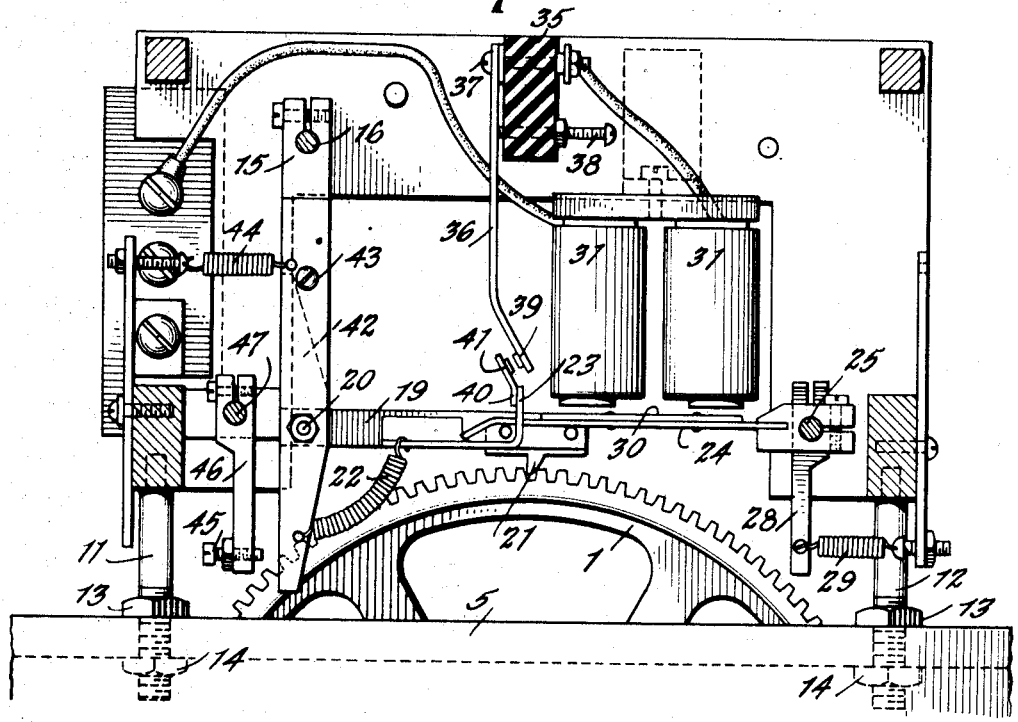
Figure 5 is a side elevational cross-sectional view along the line 5—5 of Figure 3.
Figure 6:
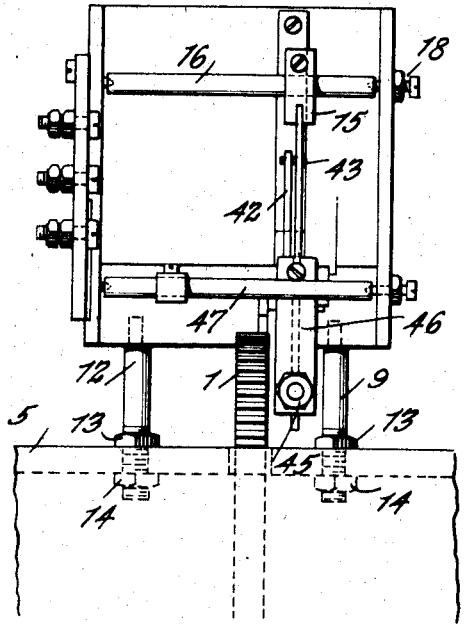
Figure 6 shows an end elevational view opposite to that of Figure 3.
Figure 7:
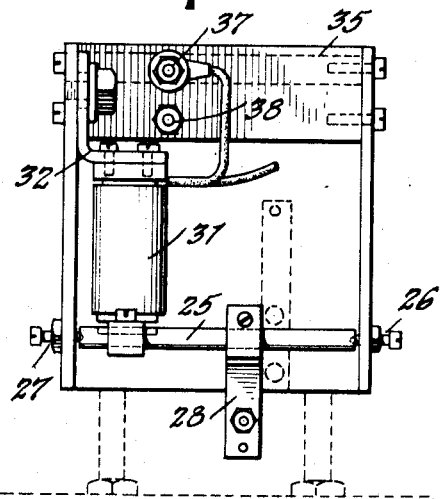
Figure 7 is an elevational view showing certain details of assembly.
Figure 8:
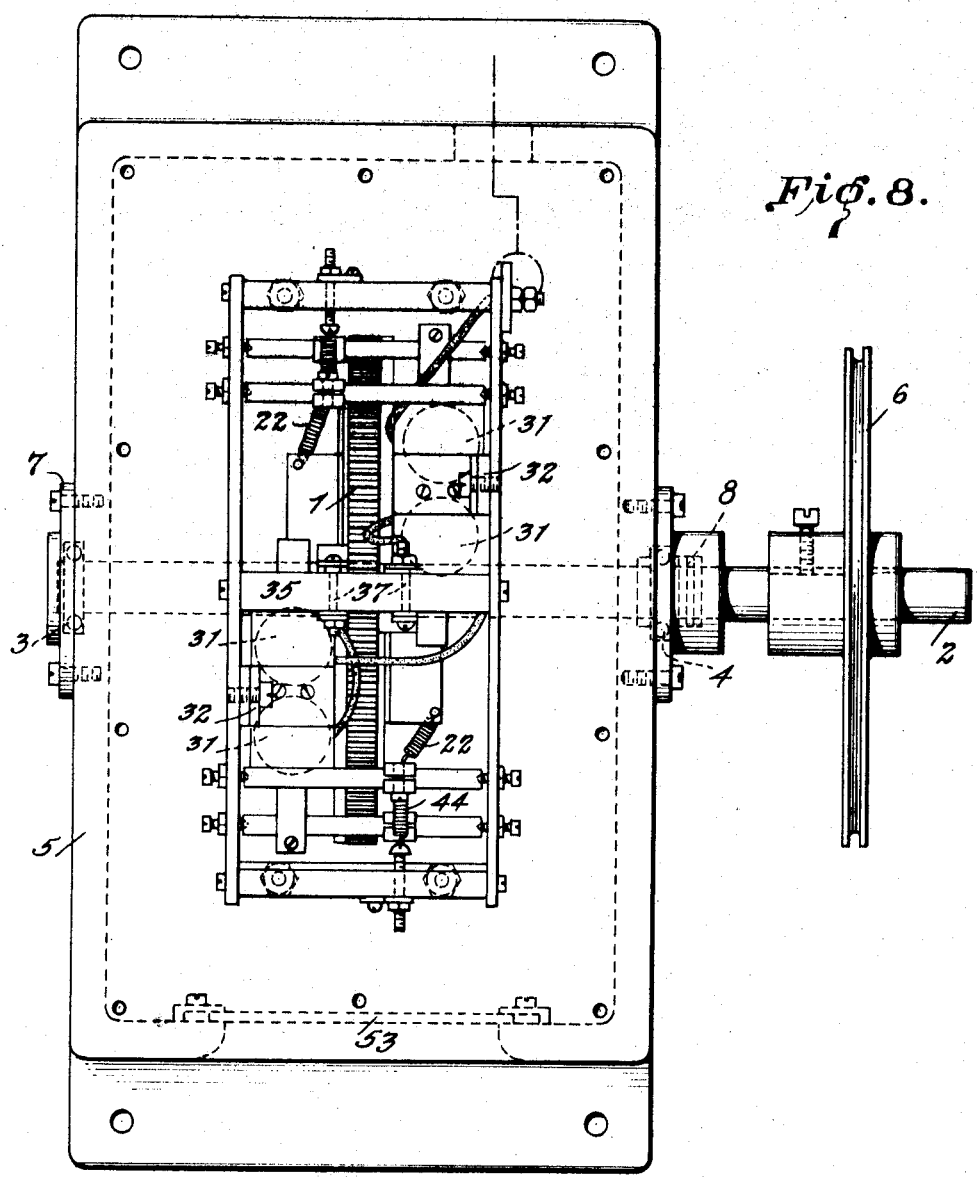
Figure 8 is a plan view of a modification of this device employing two synchronized control units for obtaining recordations of both upward and downward movements of the float.
Figure 9:
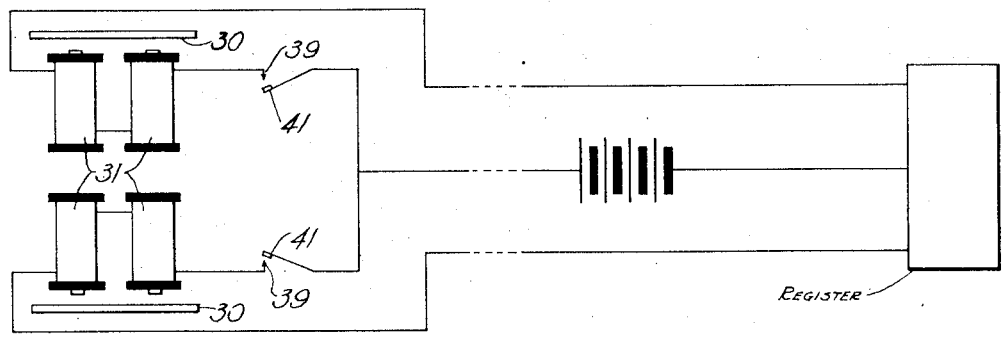
Figure 9 is a wiring diagram for the modified form shown in Figure 8.

This arrangement gives a record of downward movements of the float. Upward movements would not be recorded because any reverse movement of the pulley would cause the gear wheel to slip under the pawl and elevate it. Elevating the pawl without translating it toward the contact point 39 would not cause the contact points to touch. Therefore, to obtain a record of upward movements of the level of the liquid, it is necessary to interchange the float 55 and the weight 56. This suggests the following described method for obtaining records of both upward and downward movements at the same time without interchanging the float 55 and the weight 56. This is accomplished by simply placing two of the units together, as shown in the plan view in Figure 8. Two units such as shown in Figure 4 are oppositely mounted on the same gear wheel, the pawls of both engaging the same tooth on the gear wheel. The wiring diagram for such a two-directional assembly would be as shown in Figure 9.

Both forms of this device can be readily adjusted for different stages of level increments by changing the size of the pulley 6 or the size of the gear wheel 1 or both.

The resistance of the electro-magnet units 31 should be substantially equivalent to that of the electro-magnets used by the recording device. For this reason they are removably mounted so that they can be replaced without disturbing other parts of the instrument. Where line losses or other factors make it impractical to replace these electro-magnet units electrical resistors can be used to accomplish the same result.

Having thus described our invention, we claim:

In a float switch, a rotatably mounted gear wheel, a pawl mounted to be tangentially translated by the teeth of said gear wheel, an electrical contact point angularly disposed and carried by said pawl, a second fixed contact to cooperate with said first mentioned contact point when said pawl is translated a predetermined distance, said contact points constituting terminals of an electric circuit, electro-magnet units forming a part of said circuit and energizable when said circuit is closed by said contact points, an armature disposed beneath said electro-magnet units to coact with said pawl mounting to elevate said pawl free of said gear wheel, means for breaking said circuit when said pawl is elevated and for returning said pawl to an initial position.

WALTER U. GARSTKA.
ROBERT C. BURT.